May 9, 1939.  H. H. BRANDERT ET AL  2,157,655
TIRE ALARM
Filed May 19, 1936  2 Sheets-Sheet 1

Inventors
H. H. Brandert
L. J. Brandert
By Arthur H. Sturges
Attorney

May 9, 1939.  H. H. BRANDERT ET AL  2,157,655
TIRE ALARM
Filed May 19, 1936   2 Sheets-Sheet 2

Inventors
H.H.Brandert
L.J.Brandert
By Arthur H. Sturges  Attorney

Patented May 9, 1939

2,157,655

UNITED STATES PATENT OFFICE 2,157,655

TIRE ALARM

Henry H. Brandert and Luther J. Brandert, Herman, Nebr., assignors of twenty-five per cent to Henry Truhlsen, Herman, Nebr.

Application May 19, 1936, Serial No. 80,631

1 Claim. (Cl. 200—58)

This invention relates to tire pressure indicators and more particularly to means for use in connection with the pneumatic tires of truck or automobile wheels to show under inflation of the same.

An object of the invention is to provide means whereby the operator of a motor vehicle may know without leaving his seat whether or not the individual tires upon his vehicle are provided with the proper amount of pressure of inflation.

It is well known that it is essential to keep a constant predetermined pressure within tires in order that the tires will last a long time and give the satisfactory use for which they are particularly designed.

A further object of the invention is to provide an economical construction of indicator which may be installed upon automobiles now in use and which may be built into new vehicles at the factory.

A still further object of the invention is to provide an indicator which may be used in multiple, one for each tire on the vehicle's wheels, and which may have a lamp or other suitable device on the instrument board of the vehicle for each tire with means for closing the lamp in circuit with a pressure controlled circuit closer which may be mounted upon the corresponding wheel to be operated by the tire thereof, the circuit closer being compact and easily installed on the wheel and connected in the circuit in a novel manner and by means easily installed upon motor vehicle of common construction.

Another object of the invention is to provide means for the foregoing purposes which will also supply inflation to a tire for a reasonable length of time in the event that a tire becomes punctured as well as maintaining an automatic pressure in the tire during long traveling periods of operation, said means being arranged for supplying equal pressures to the dual tires of a vehicle wheel from a source of supply common to both tires whereby a load is evenly distributed on each supporting tire.

Other and further objects and advantages of the invention will be understood from the following detailed description, reference being had to the accompanying drawings in which.

Figure 1:
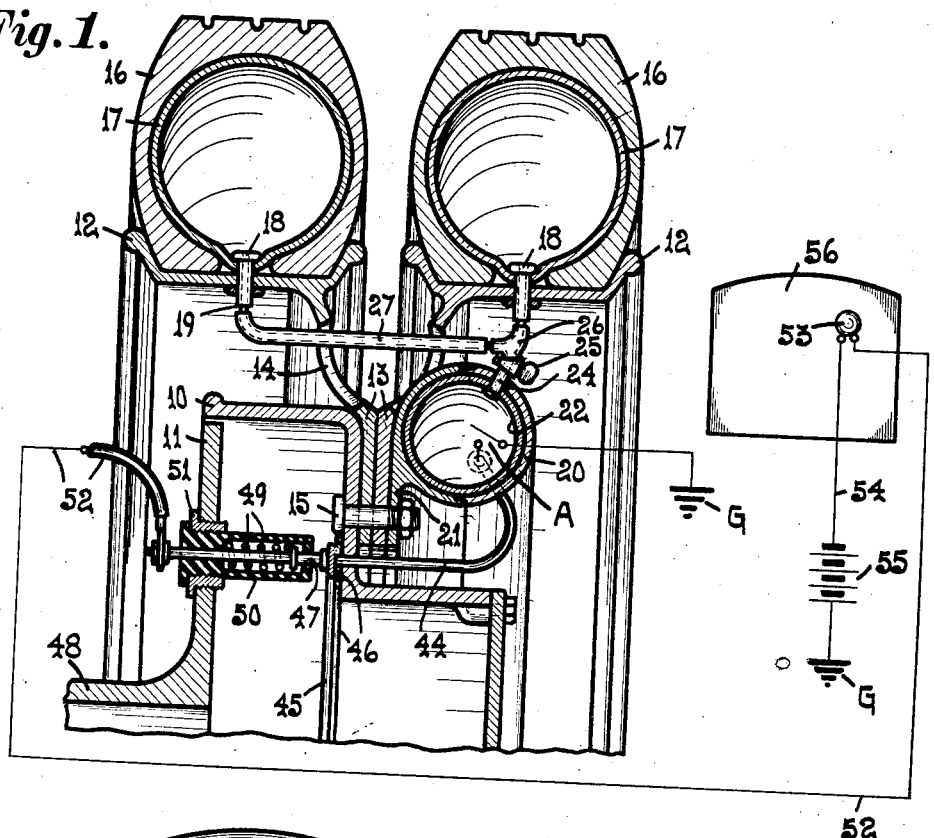
Figure 1 is a vertical section taken through a fragment or segment of a truck wheel and the dual tires thereof and showing an embodiment of the present invention applied thereto, the view being taken substantially on the dotted line 1—1 of Figure 2 and turned at an angle of 90 degrees with respect to the showing thereof in Figure 2.

Referring now to the drawings and first to Figure 1, 10 designates the brake drum of a motor vehicle wheel which is supported by an axle in a well-known manner and is provided with a nonrevoluble face plate 11 to which a brake mechanism not shown is attached. The tire rims 12 are supported by their webs or discs or spokes 13 and where discs are employed the latter are provided with apertures 14. The discs 13 are removably secured to the brake drum housing by means of bolts 15 in a manner whereby one or both rims 12 may be demounted from the vehicle at desired times, the foregoing described parts being conventional as well as the tires 16, their inner tubes 17 and the air admission valves 18 of the latter. The stems 19 of the valves 18 project through the rims 12 and are provided with removable lock nuts in a well known manner.

Figure 2:
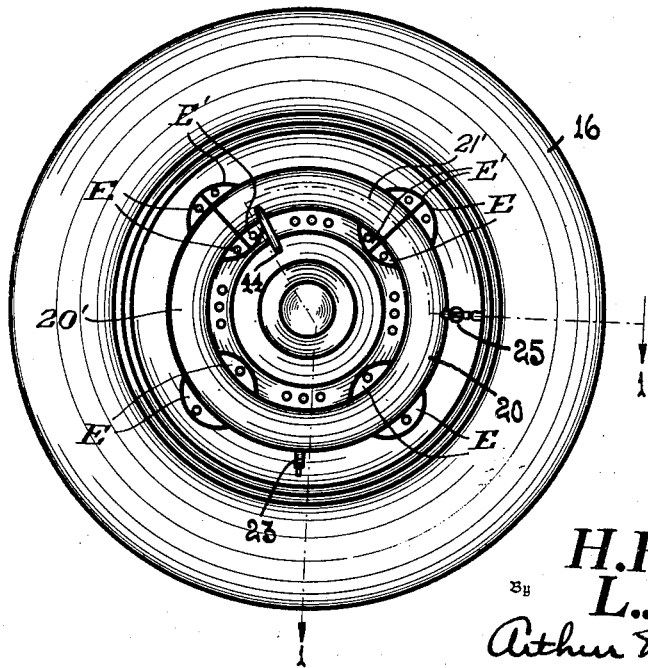
Figure 2 is a side view of a truck or automobile wheel and the said embodiment.

The new device includes an annular housing 20 of semi-circular hollow shape in cross section having a like shaped cover of two-piece construction, said cover being removable from said housing the parts thereof being indicated at 20' and 21'. The housing and cover are placed within the plane of one of the dual wheels as shown in Figure 1, said housing having an annular flange 21 provided with bolt-holes whereby the housing may be secured to the disc 13 by means of the bolts 15 or the like. As best shown in Figure 2, the two cover parts 20' and 21' are each provided with ears E and E' of complemental shape with respect to the lugs L of the housing as shown in Figure 3 whereby the bolt holes are employed for bolting the housing and each of said cover parts together as shown in Figure 2 for resisting later mentioned air pressure.

Figure 3:
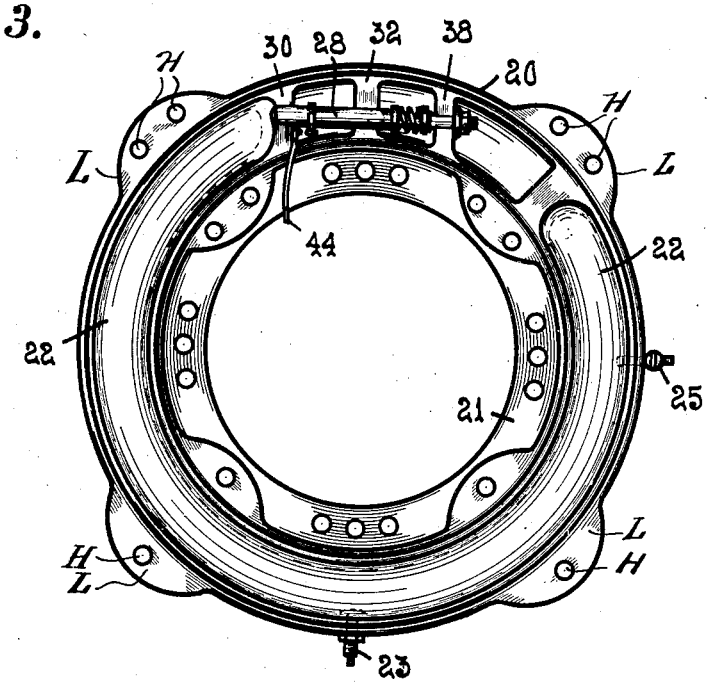
Figure 3 is a side elevation of said embodiment, a cover plate thereof being removed.
Figure 4:
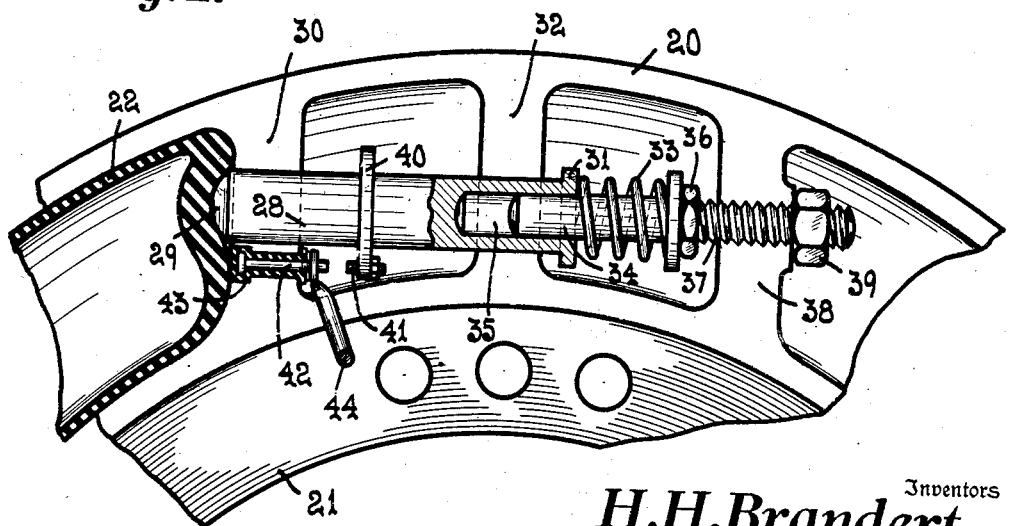
Figure 4 is a fragmentary enlarged inner face view of the main section of a casing for the air supply tube of the device.

As shown in Figure 3, one-half of the housing 20 or its two-piece cover plate is removable therefrom said parts dovetailing together as shown in Figure 1 and within the housing a flexible rubber tube 22 is provided extending annularly from a major portion of said housing. A segment of the housing 20, as shown in Figures 3 and 4, not containing said tube 22 and providing space for enclosing therein certain devices later described.

The tube 22 is provided with an air intake valve 23 which projects through the perimeter of the housing 20 as shown in Figures 2 and 3, said valve being similar to the tire valves 18 in construction. As thus described it will be understood that at times when the tube 22 is within its housing 20 and the parts of the latter are locked together that air pressure may be admitted to the tube 22 through the valve 23, the construction of the latter being such that it will permit passage of air pressure into the tube or in one direction and check an outlet of said air through said valve in an opposite direction.

As best shown in Figure 1, the tube 22 is provided with an outlet conduit or stem 24 which projects through the housing 20 and is provided with a cut off cock 25 which the operator may manipulate with his fingers for preventing air from flowing from the tube 22 through the outlet duct 24 at desired times. The outlet end of the duct 24 is provided with a T 26 having secured thereto a flexible hose, pipe or conduit 27, the terminal end of which is removably attached to the air intake end of the stem 19 of one tire air valve 18, the other tire valve being in communication with the other branch of the T 26.

As thus described it will be noted that when air under pressure, admitted from a source of supply not shown, enters the air intake valve 23 and into the tube 22, that at times when the cock 25 is open, said air pressure is simultaneously and evenly applied to the valve stems 18 for inflating both tires 16 simultaneously with an equal amount of air under an equal amount of pressure. While changing tires or at desired times the cut off cock 25 may be closed for retaining the pressure within the tube 22.

Means are provided for indicating to the operator the condition of the tires in the event that either one or both become deflated below a preselected pressure. Said means includes a sleeve 28 mounted for longitudinal sliding movements half in the housing 20 and half in the cover portion 21', having an end 29 which normally projects through the bifurcated wall 30 of said housing, being in abutting relation with the tube 22. An end of the sleeve 28 is provided with a lug 31 which prevents too great a movement in one direction of said sleeve, said lug contacting with the surface of a bifurcated second divisional wall 32 of the housing 20 and at times when the sleeve 28 is urged toward the tube 22 by means of a spring 33 positioned about a guide stud 34, an end of the latter being received within a recess 35 of the sleeve 28. The urge or tension of the spring 33 is adjustable by means of rotating a nut 36 positioned upon the threads 37 of the stud 34, one end of the latter being threaded through a bifurcated third wall or support 38 of the housing 20 and having a nut 39 adjacent its outer end.

The sleeve 28 is formed of metal and provided with a collar or boss 40 having an adjustable contact 41 which at times is adapted to cooperate with a stationary contact 42 mounted in the wall 30 and insulated therefrom by means of the fiber bushing 43. The stationary contact 42 is in electrical communication with a wire 44 which, as best shown in Figure 1, extends to and is in electrical communication with an annularly disposed electrode 45 suitably positioned preferably within the brake drum housing and insulated therefrom by means of an annular gasket of fiber 46. The slidable contact 41 and the stationary contact 42 are diagrammatically illustrated at A in Figure 1 and it will be understood that the contact 41 is in electrical communication with the ground G, being grounded on to the said housing or vehicle.

There is an electrode or brush 47 in contact at all times with the annular ring electrode 45, the latter having revoluble movements with the brake drum housing and tire 16, the electrode 47 not rotating, being carried by the non-rotatable face plate 11 of the axle housing or steering knuckle 48.

The electrode 47 is slidable being urged against and in contact with the annular electrode 45 by means of a spring 49 positioned within a cage or housing of insulation 50. The spring 49 functions to take up wear of the head of the brush. The member 50 may be carried by a plug 51 screwed through the face plate 11.

The outer end of the electrode 47 is in communication with a wire 52 which extends to the instrument board 56 of the vehicle and is in electrical communication with an electric light, a bell or both in accordance with whether or not it is desired to visibly or audibly indicate tire conditions, said bell or electrical light being indicated at 53 in Figure 1 and having a wire 54 extending to the battery 55 of the vehicle, said battery being grounded to the chassis or frame of said vehicle, said ground being indicated at G whereby at times when the switch A is closed there is an electrical circuit established and closed through said ground G, battery 55, the indicator 53, line wires 54 and 52, the electrodes 45 and 49, the wire 44 and contacts 42 and 41, the latter being in direct communication with said ground.

In operation by removing the two-piece cover half portion of the housing 20, the nut 36 is accessible for adjusting the tension of the spring 33, for providing a stiffer spring for higher pressures as may be desired for the requirement of an individual tire or the dual tires shown in Figure 1.

Assuming that the tires 16 are to carry a normal working air pressure of 50 pounds, air under said pressure is admitted to the tube 22 through its valve stem 23, said pressure being thereby applied to the end 29 of the sleeve 28 and compressing the spring 33 and permitting the sleeve 28 together with the contact electrode 41 to move away from the tube 22 for providing an open closable circuit with respect to the indicator 53. The air from the tube 22 is communicated from the latter to the inner tubes 17 of the tires 16 providing in each an equal 50 pounds of air pressure, the cut off cock 25 at this time being open and it will be noted that by means of the communication of air through the T 26 that both tires 16 may be inflated not only simultaneously but also equally. Should one of the tires become punctured the auxiliary air from the tube 22 will maintain the punctured tire 16 inflated for a short period of time, more especially if the puncture is in the nature of what is known as a "slow leak"; while at the same time the oppositely disposed tire 16 remains at a normal pressure and the fact that one of the tires is of less than normal pressure becomes indicated to the operator since the lesser pressure or lack of pressure within the tube 22 permits the electrode 41 to contact with the electrode 42 for closing a circuit through the indicator 53 for informing the operator that one of the tires of a certain wheel contains less than a normal pressure, whereby the operator is provided with the information that is necessary to authorize him in the substitution of a fully inflated tire for the punctured tire. Also in the event that the tires during normal operation do not become punctured they nevertheless require inflation at intermittent periods of time and the fact that one or both tires requires further inflation may be noted by the operator at all times.

It will be understood that while we have herein described our invention as applied to a vehicle wheel having dual tires that the invention is equally applicable to a vehicle wheel having a single tire although the invention is primarily intended for use in conjunction with dual tired truck wheels, the cost of the type of tire required for trucks comprising an appreciable percentage of the overhead expense in the commercial operation of trucking and hauling.

It is, of course, understood that there is a lamp or indicator 53 for each wheel of the vehicle and that on each wheel there is mounted the circuit maker and its brush or electrode 47 and the cooperating and connecting parts so as to accommodate a wire 52 for each lamp 53 employed and thus individually indicate when under inflation occurs.

We do not wish to be restricted to the size, form and proportions of the various parts, and obviously changes could be made in the construction herein described without departing from the spirit of the invention, it being only necessary that such changes fall within the scope of the appended claim.

What is claimed is:

A dual tire structure comprising a pair of pneumatic tires having the usual air inlet valves, an air reservoir in the form of a pneumatic tube having an air inlet valve, a T-coupling having one opening connected to said tube, and a second opening connected to the valve of one of said tires, and a conduit connected to the valve of the other tire and to the third opening of the T-coupling, a plunger having one end in contact with said tube, the opposite end of said plunger being provided with a recess, a guide stud having one end received by the recess in the plunger, a nut adjustably mounted on said stud, a coil spring surrounding the stud and engaging the nut and the recessed end of the plunger, a fixed electrical contact, and a movable electrical contact rigid with said plunger and movable bodily with the plunger, said pneumatic tube adapted to maintain the plunger in a position in which its contact is spaced from the fixed contact when the tire is properly inflated.

HENRY H. BRANDERT.
LUTHER J. BRANDERT.